United States Patent [19]

Yasuda et al.

[11] Patent Number: 4,715,469

[45] Date of Patent: Dec. 29, 1987

[54] BOREHOLE SEISMIC RECEIVER

[75] Inventors: Arthur K. Yasuda, San Francisco; William S. Kennedy, Palo Alto; Peter S. Aronstam, Cupertino, all of Calif.

[73] Assignee: Petrophysical Services, Inc., Mountainview, Calif.

[21] Appl. No.: 770,796

[22] Filed: Aug. 29, 1985

[51] Int. Cl.$^4$ .............................................. G01V 1/40
[52] U.S. Cl. .................................... 181/102; 181/401; 367/911; 166/66; 166/212
[58] Field of Search .................. 73/151; 166/338, 354, 166/355, 66, 242, 212; 181/102, 103, 104, 105, 106; 367/13, 25, 911, 912; 33/302, 303, 304

[56] References Cited

U.S. PATENT DOCUMENTS

| | | | |
|---|---|---|---|
| 2,699,001 | 3/1987 | McMahan | 367/13 |
| 3,426,865 | 2/1969 | Henry | 181/104 |
| 3,661,205 | 5/1972 | Belorgey | 166/212 X |
| 4,365,668 | 12/1982 | Bright | 166/214 |
| 4,428,422 | 1/1984 | Laurent | 166/212 |
| 4,509,149 | 4/1985 | Ruehle | 367/27 |
| 4,563,757 | 1/1986 | Decorps et al. | 181/104 X |
| 4,575,831 | 3/1986 | Decorps et al. | 181/104 X |

FOREIGN PATENT DOCUMENTS 0100708 2/1984 European Pat. Off. .
2501380 9/1982 France .

OTHER PUBLICATIONS

Brochure Borehole Seismometer, Model VLP-N785, EG&G Geometrics.

Primary Examiner—Deborah L. Kyle
Assistant Examiner—Brian S. Steinberger
Attorney, Agent, or Firm—Robert E. Lowe

[57] ABSTRACT

A seismic receiver is provided for measuring seismic signals transmitted through the earth and received in a well borehole. A reversible electrical motor drives a harmonic drive reducer which amplifies the torque provided to drive a ball screw. The ball screw moves linearly along the axis of the well borehole to control the extension of a clamp arm into and out of an extended position in contact with subsurface earth adjacent the well borehole. A releasable electric clutch is provided so the receiver is retrievable in the event of a power failure while the clamp arm is extended.

2 Claims, 8 Drawing Figures

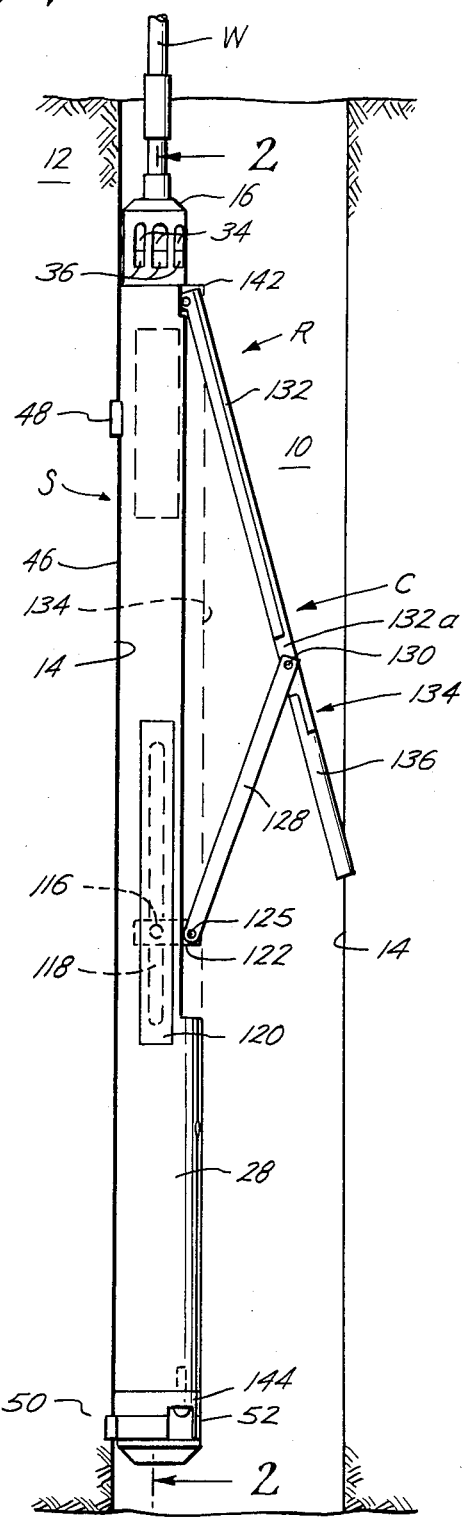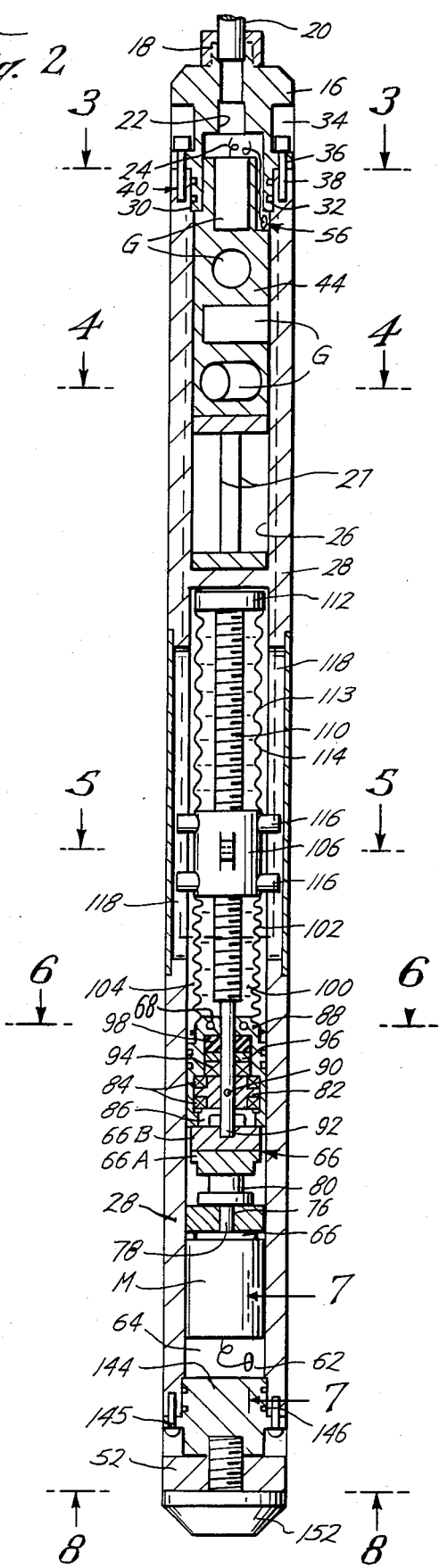

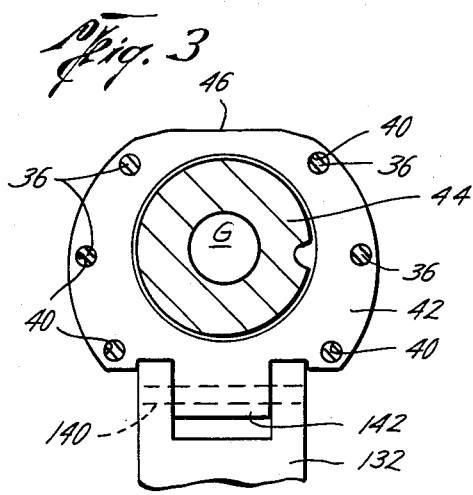
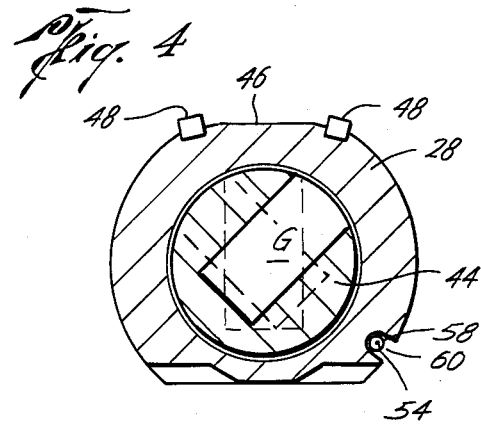
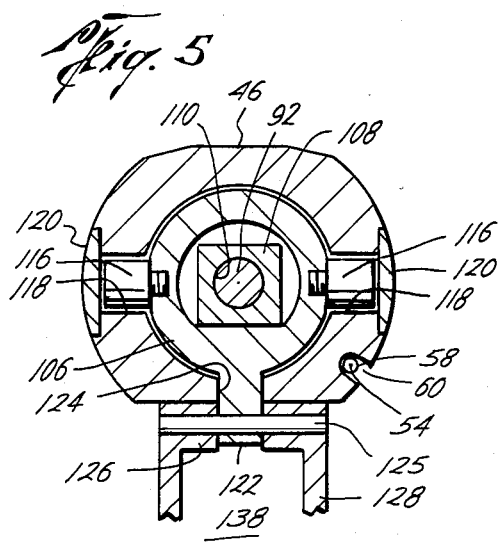
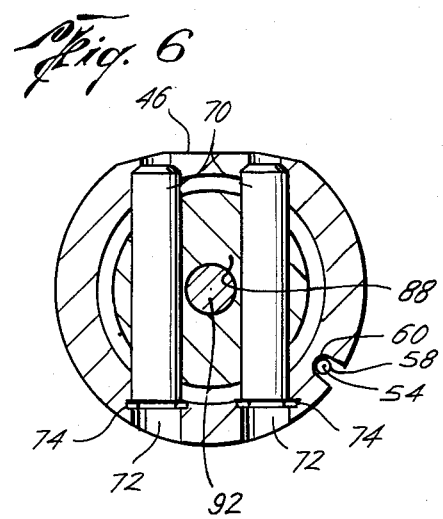
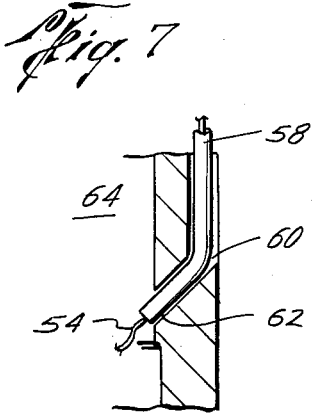
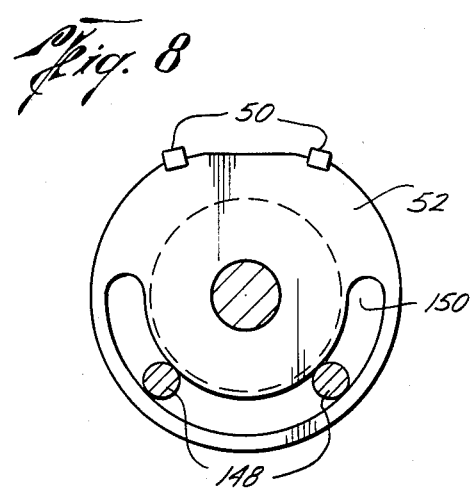

BOREHOLE SEISMIC RECEIVER

BACKGROUND OF INVENTION

1. Field of Invention

The present invention relates to receivers for seismic signals used in well boreholes.

2. Description of Prior Art

In sonic logging of a well seismic receivers in the form of sondes containing geophones are lowered into the well borehole on a conductive armored cable to selected depths or formations of interest. The geophones then sense the response of subsurface formations to acoustic or elastic wave energy emitted from a suitable source of seismic energy. It has been known to be important that the geophones accurately sense the seismic energy for purposes of data accuracy. Good, firm mechanical engagement between the sonde and the borehole was necessary to insure that the seismic energy was effectively coupled from the earth to the geophones. The mechanical engagement of the tool with the bore hole wall also had to be effectively releasable so that the sonde could be easily moved to selected depths and also so that the sonde could be easily retrieved.

An additional problem was that existing seismic receivers did not, so far is known, have uniform frequency response over the seismic frequency range of interest. Existing tools did not exhibit a very flat frequency response for frequencies below about one hundred hertz particularly in the horizontal axis. Causes for this problem may have resulted from insufficient clamping force, bending modes in the tool, or rocking of the tool, particularly in an axis perpendicular to that of arm members of the tool used to clamp the tool in contact with the earth formation around the well borehole, or other factors.

SUMMARY OF INVENTION

Briefly, the present invention provides a new and improved seismic receiver for use in a well borehole to sense the response to seismic energy waves of an earth formation adjacent the well borehole. Geophones which sense the response of the earth formations to seismic energy waves are housed in a sonde which is lowered to selected depths in the well borehole. At the desired depths, the sonde is urged into firm contact with a wall of the borehole to insure good coupling of the seismic receiver with the borehole wall.

A contact arm mounted with the sonde is kept in a retracted position adjacent the sonde during movement of the sonde up or down the borehole. When a selected depth is reached, a motor is energized to drive the contact arm firmly into engagement with the borehole wall, also driving the sonde firmly into contact with the borehole wall. The motor is preferably a reversible electric motor, generating torque to move the contact arm. Means in the form of a harmonic drive gear mechanism are provided between the motor and the contact arm to amplify the torque from the motor. High clamp forces are achievable due to the high torque applied by the motor harmonic drive combination, and the linkage arrangement of the clamp arm which applies the force near the end of the clamp arm (away from the pivot). A releasable clutch is provided so that the tool may be extracted from the well in the event of a power failure to the motor while the contact arm is in the extended position.

The sonde is formed of a unitary rigid body which contains the geophones and the motor. The rigid sonde body, its short length, high clamping force and precisely located contact feet combine to give the tool a minimum natural frequency in excess of 150 Hz, permitting the tool to accurately take data over a wider seismic band. The sonde has the contact arm pivotally mounted on a side portion at one end of the contact arm. A substantially flat surface is formed on an opposite side portion of the sonde from the contact arm. As the contact arm is driven into firm engagement with the borehole wall, the sonde is thus also firmly engaged with the borehole wall to insure good coupling of seismic energy waves because the flat surface prevents the sonde from rocking.

BRIEF DESCRIPTION OF THE DRAWINGS

FIG. 1 is an elevation view of an apparatus according to the present invention in a well borehole;

FIG. 2 is a cross-sectional view taken along the lines 2—2 of FIG. 1;

FIG. 3 is a cross-sectional view taken along the lines 3—3 of FIG. 2;

FIG. 4 is a cross-sectional view taken along the lines 4—4 of FIG. 2;

FIG. 5 is a cross-sectional view taken along the lines 5—5 of FIG. 2;

FIG. 6 is a cross-sectional view taken along the lines 6—6 of FIG. 2;

FIG. 7 is a cross-sectional view taken along the lines 7—7 of FIG. 2; and

FIG. 8 is a cross-sectional view taken along the lines 8—8 of FIG. 2.

DESCRIPTION OF THE PREFERRED EMBODIMENT

In the drawings, the letter R (FIG. 1) designates generally a seismic receiver deployed in a well borehole 10 to sense the response to seismic energy waves of an earth formation 12 adjacent the well borehole 10. The receiver R includes a suitable number of geophones G (FIG. 2) which sense the response of the earth formation 12 to seismic energy waves. The geophones G are housed in a sonde S which is suspended from an electrically conductive wireline W within the borehole 10. A contact arm C mounted with the sonde S, which is driven by a reversible drive electrical motor M (FIG. 2), releasably urges the sonde S into contact with a borehole wall 14 in accordance with the present invention at selected depths in the borehole 10 so that the geophones G may accurately sense seismic energy waves.

Considering the receiver R in more detail, the sonde S includes an upper connector member 16 which is threadedly connected at a surface 18 (FIG. 2) with a lower connector portion 20 of the wireline W. The electrical conductors of the wireline W pass through a central passageway 22 in the connector member 16. Electrical conductors are provided in the wireline W for each of the geophones G, as indicated schematically at 24, as well as for other purposes set forth below. Electrical conductors 24 for the geophones G extend from the passageway 22 into a geophone housing which also contains the tool electronics.

The housing member 28 is an elongate, generally tubular unitary rigid metal body, usually of a length of between three and four feet. O-ring grooves are formed on the upper connector to receive O-rings 32 which seal against the counterbore 30 in the housing member 28. Sockets 34 are formed in the upper connector member 16 so that connector screws 36 may be inserted through openings 38 (FIG. 2) at spaced locations on the periphery of the upper connector member 16 into threaded sockets 40 (FIGS. 2 and 3) formed on a top surface 42 of the housing member 28 to form a strengthened connection between the housing member 28 and the upper connector member 16.

The geophones G in the seismic receiver R are typically mounted in a cylindrical metallic member 44. In one embodiment, four geophones G are provided, two spaced at right angles from each other (FIG. 2) for receiving seismic signals in a horizontal plane from the earth formation 12 at a selected depth in the borehole 10 on axes transverse the longitudinal axis of the borehole. A third geophone is mounted vertically. A fourth, which is provided for calibration purposes is excitable by an electrical testing signal sent from the surface through the wireline W to emit seismic energy, is provided to test the adequacy of earth coupling of the seismic receiver R before sensing operations begin. Below the geophones G is a cavity 26 which contains two printed circuit boards 27 which amplify the signals from the geophones G.

The housing member 28 has a substantially flat earth contact surface 46 formed along its length on a side opposite the contact arm C. If desired, a suitable number of earth contact feet 48 are mounted at spaced positions on the earth contact surface 46. A set of lower contact feet 50 are mounted with a rotatable foot member 52 beneath the housing member 28.

Electrical conductors shown schematically at 54 from the wireline W provide electrical power to operate the motor M. The motor M is preferably a reversible drive, direct current electrical motor, with the direction of drive being governed by the polarity of electrical energy supplied by conductors 54. The electrical conductors 54 pass from the central passageway 22 (FIG. 2) into a port 56 in which is mounted a tubular member 58. The tubular member 58 serves as a conduit for the conductors 54 of electrical power for the motor M and extends along a groove or slot 60 (FIGS. 4-7) formed in the housing member 28 downwardly to a port 62 (FIG. 7) formed in the housing member 28 adjacent a motor chamber 64.

The motor M is mounted in the motor chamber 64 beneath a mounting plate 68 in the housing member 28. A central opening 76 is formed in the mounting plate 68 so that a drive shaft 78 driven by the motor M may connect with a harmonic drive gearing mechanism 80 (FIG. 2). The harmonic drive gearing mechanism 80 causes the clutch rotor (66A) to rotate. When the clutch is energized by conductors 54, the clutch armature (66B) also rotates with the same speed as the clutch rotor (66A) and harmonic drive output 80. The clutch armature 66B is connected with fastening screws to the thrust plate 82. Clutch 66 receives electrical power from the same source as the motor M. However, the amount of rotation of the clutch 66 by the harmonic drive mechanism 80 for each rotation of the shaft 78 of the motor M is a very small fractional increment of a revolution, allowing precise control of rotation of thrust plate 82 while also amplifying the torque imparted thereto. Typically, one revolution of drive shaft 78 causes the harmonic drive mechanism to rotate the thrust plate 82 on the order of 1/50 to 1/100 of a revolution. The thrust plate 82 is mounted with thrust bearings 84 in a socket 86 formed in a pressure plug member 88. The pressure plug 88 is held in place by mounting pins 70 (FIG. 6) which are held in place in openings 72 by means of snap-rings 74. The thrust plate 82 is connected by a pin 90 which passes therethrough to a lower end of a ball screw drive shaft 92. The pin 90 is inserted through aligned openings formed in the pressure plug 88, thrust plate 82 and drive shaft 92.

The ball screw drive shaft 92 extends upwardly from the pin 90 through a bearing 94, a seal retainer plug 96 and an elastomer seal 98 into a chamber 100. Chamber 100 is formed in the interior of a lower bellows 102 in a ball nut housing 104 in the housing member 28. The bellows 102 is sealingly mounted, such as by snap rings, at a lower end to the pressure plug 88 at an upper end to a ball nut truck or carrier 106 (FIG. 5). Fixedly mounted within the ball nut carrier 106 is a ball nut 108 which rides on a threaded portion 110 of the ball screw 92 linearly along the axis of the well borehole. The direction of longitudinal movement of the ball nut 108 and its carrier 106 within the housing 28 is determined by the direction of rotation of the ball screw 92 as driven by the reversible electrical motor M. The amount of longitudinal movement of the ball nut 108 and ball nut carrier 106 is governed by the number of rotations of the ball screw 92. As has been set forth, the amount of rotation of the ball screw 92 is governed and precisely controlled by the harmonic drive gearing mechanism 80, permitting precise adjustment of the amount of movement of the ball nut 108 and ball nut carrier 106.

A support plate 112 (FIG. 2) is mounting at an upper portion of a bellows 113 in an upper bellows housing 114 within housing 28 to contain an upper end of threaded portion 110 of ball screw 92. Bellows 113 is suitably sealed at each end, such as by snap rings. The interiors of the bellows 102 and 113 are filled with a suitable fluid, such a silicon oil, to lubricate the threaded portion 110 and the ball nut 108.

Guide lugs or rollers 116 (FIG. 5) are mounted in pairs on each side of the ball nut carrier 108 and fit within longitudinal grooves or slots 118 formed along side portions of the housing 28. The guide lugs 116 provide stability of movement of the ball nut carrier 106 within the housing 28. Side closure plates 120 are mounted to seal the slots 118 in the housing 28.

The ball nut truck 106 has an outwardly extending lug 122 formed thereon which fits within a longitudinal groove 124 formed within the housing 28. The lug 122 is connected by a connecting pin 125 to a yoke 126 of a linkage arm 128 of the contact arm C. The linkage arm 128 is pivotally connected by a pin 130 at an outer end to an upper portion 132 of a probe arm 134. A portion of the upper arm member 132 has been removed as indicated at 132a (FIG. 1) and a connected lower arm member 136 is of a similar reduced size from upper arm member 132 so that these portions of the probe arm member 134 fit within a gap 138 in the yoke member 128. In this manner, the probe arm member 134 mounts substantially flush, as indicated in phantom in FIG. 1, with the housing member 28 when the contact arm C is in the retracted position. The upper arm member 132 of the probe arm 134 is pivotally connected by a pin 140 (FIG. 3) to a mounting lug 142 formed at an upper end of the housing member 28.

The rotating foot 52 is mounted beneath a closure plug 144 which fastens with six screws 145 to the end of the housing 28. Grooves for O-ring seals 146 are provided. Cam follower arms 148 are mounted extending beneath the closure plug 144 and are located in an arcuate or curved track 152 formed in the rotating foot 52. A bull plug 150 threads into the bottom of the closure plug 144. In the embodiment shown in the drawings, four contact pads are provided, two upper contact pads 48 two lower contact pads 50. If the borehole wall 14 has an irregular surface, the possibility exists that only three of these pads would be in engagement with the borehole wall. This would permit the receiver R to vibrate in a rocking mode in the horizontal plane. The rotating foot 52 of the present invention helps to keep resonant vibration frequencies in the seismic receiver R substantially higher than was obtainable in the prior art. The cam followers 148 in the curved track 150 provide for rotational movement of the rotatable foot 52, eliminating the possibility of a rocking movement of the housing 28 due to horizontal excitation.

In the operation of the present invention, the seismic receiver R is lowered in the well borehole 10 to the desired depth. Electrical power is then furnished to the motor M through the wireline W, causing the harmonic drive gear mechanism 80 to rotate the drive shaft 92 and its threaded surface 110. This causes the ball nut 106 to advance along the threaded surface 110, moving the linkage arm 128 and clamp arm 132 outwardly away from the housing 28. Movement of the clamp arm 132 outwardly continues until firm engagement of the lower arm section 136 with the borehole wall 14 is achieved. At this point, the test geophone can be provided electrical power to generate acoustic test signals and the response of the sensor geophones monitored to insure that firm contact has been achieved with the borehole wall 14. Should firmer contact be determined necessary, the motor M is again energized to move the probe arm 134 into firmer contact with the borehole wall. Once the seismic receiver R has been suitable firmly positioned for operation, seismic signals are generated from a source to travel through the earth. The seismic signals are received by the sensing geophones G in the receiver R and converted into electrical signals which are conveyed via the wireline W to recording instrumentation at the surface.

Once seismic receiving operations have been completed, the flow of electrical current to the motor M is reversed, causing reverse rotation of drive shafts 78 and 92 and reverse movement of the ball nut 108 and ball nut truck 106. This movement of ball nut 108 moves the linkage arm 128 inwardly and consequently moves the clamp arm 132 out of contact with the borehole wall 14. Downward movement of the ball nut 108 and ball nut truck 106 continues until the contact arm C has been brought to a retracted position with the housing 28. Once this is done, the seismic receiver R may be moved to a different depth in the borehole or removed from the borehole 10, as desired.

The clutch 66 is provided so the receiver R is retrievable in the event of a failure of power to the motor M with the contact arm C in the extended position. If there is a failure of power to motor M, clutch 66 will likewise receive no power and thus uncouple, permitting the weight of the contact arm C to cause the ball nut 108 to move downwardly on the threaded portion 110 of the drive shaft 92 to a position where the contact arm C comes out of contact with the wall of the borehole 14. Thus, in the event of a power failure with contact arm C in the extended position, the clutch 66 permits the seismic receiver R to be retrieved from the well borehole 10.

The foregoing disclosure and description of the invention are illustrative and explanatory thereof, and various changes in the size, shape and materials, as well as in the details of the illustrated construction may be made without departing from the spirit of the invention.

We claim:

1. A seismic receiver for use in a well borehole to sense the response of an earth formation adjacent the well borehole to seismic energy waves, comprising:
   (a) geophone means for sensing the response of the earth formations to the seismic energy waves;
   (b) sonde means for housing said geophone means, said sonde means having a substantially flat surface;
   (c) means for releasably urging said sonde means into contact with the borehole wall along said substantially flat surface, said means comprising:
      (i) a contact arm pivotally mounted at one end to said sonde means on the side opposite said substantially flat surface and movable between a retracted position adjacent said sonde means for movement through the borehole to a selected depth and an engaged position in firm contact with the borehole wall at the selected depth,
      (ii) motor means for driving said contact arm between the retracted position and the engaged position,
      (iii) clutch means mounted between said motor means and said contact arm enabling retraction of said contact arm in the event of failure of said motor means;
   (d) said sonde means including rotatable means which allows the lower end portion of said sonde to rotate to firmly seat said sonde against the borehole wall despite wall irregularities.

2. The apparatus of claim 1 further comprising contact feet members mounted on said substantially flat surface of said sonde means.

* * * * *